UNITED STATES PATENT OFFICE.

CARL FERDINAND DAHL, OF DANTZIC, PRUSSIA, GERMANY.

PROCESS OF MANUFACTURING CELLULOSE FROM WOOD, &c.

SPECIFICATION forming part of Letters Patent No. 296,935, dated April 15, 1884.

Application filed March 4, 1884. (No specimens.)

*To all whom it may concern:*

Be it known that I, CARL FERDINAND DAHL, a subject of the King of Prussia, residing at Dantzic, in the Kingdom of Prussia and German Empire, have invented new and useful Improvements in Process for the Manufacture of Cellulose from Wood and other Vegetable Substances, of which the following is a specification.

This invention consists in a process for the manufacture of cellulose from wood and other vegetable substances.

For the purpose of dissolving the cellular mass or fibrous mass out of the bodies incrusting the same, the comminuted wood, straw, esparto, and the like are boiled under pressure in wrought-iron vessels free from lead lining, containing a hydrated solution in which are contained sodium salts, partly in the form of sulphate of soda, carbonate of soda, soda hydrate, and sulphide of sodium. One hundred kilograms (about two hundred and twenty pounds avoirdupois) of half-dried pine wood require about twenty-six kilograms of the above-named salts in solution; straw or alfa, (esparto,) about ten to twelve kilograms. Pine or fir wood requires five to ten atmospheres overpressure, the strength of the sodium solution being 6° to 14° Baumé, the time of boiling thirty to four hours. Straw or alfa (esparto) requires two to five atmospheres overpressure, the strength of the sodium solution being 5° to 8° Baumé, and duration of boiling eight to three hours. By the boiling process the incrustations combine with the sodium solutions; the cellular matter remains uninjured in a loose consistency. After the boiling is completed, the brownish-black lye is blown off into iron basins for the purpose of afterward recovering the sodium salts. The remaining cell matter is washed with warm water in the boiler or other suitable receptacle, and is then manufactured into paper-pulp, in the well-known way, by means of a Hollander or pulp engine, and bleached with a solution of chloride of lime. The color of the unbleached mass is yellowish gray; that of the bleached mass pure white or slightly but a clear yellowish, according to the degree of bleaching.

Sulphate of soda serves for the production of the sodium solution. The sulphate dissolved in water is boiled with about twenty to thirty per cent. of burnt lime. The lye thus prepared is already serviceable for boiling; but it receives its proper composition by the addition of the salts regained from the sulphate solution after the boiling process. The lye, after being used, is forced into an evaporating-oven for the purpose of regaining the salts, is strongly calcined, and after thus being deprived of gas is drawn from the oven as a cake-like mass, washed, and the resultant solution used for the preparation of fresh lye.

For obtaining pure salts without the admixture of carbon, the thickened lye is drawn from the evaporating-oven and is fused in a calcining-oven at a dark-red heat. The fused mass, after cooling, assumes a reddish-brown color, is readily soluble in water, and has approximately the following composition: sixteen per cent. sulphate of soda, fifty per cent. carbonate of soda, twenty per cent. sodium sulphide, four per cent diverse non-essential matters. This composition is very variable, according to the properties of the boiled matter, but without influencing the dissolving power of the solution afterward prepared therefrom. The salt which is regained should be dissolved as soon as possible, or guarded against the influence of atmospheric air. By the process of boiling and regaining, about ten to fifteen per cent. of the salts in the solution is lost. In general practice the losses are replaced in the preparation of the lye by sulphate of soda. For the solution are taken eighty-five to ninety per cent. of regained salt and fifteen to ten per cent. of sulphate, which mixture, boiled with twenty to twenty-three per cent. of burnt lime, yields the proper lye. With ten per cent. of loss a clear watery solution is taken for the lye, in which are contained ninety kilograms of regained salt; ten kilograms of sulphate are added, and the solution in which are contained one hundred kilograms (about two hundred and twenty pounds) of salts in the already-named proportion is boiled with twenty kilograms of burnt lime. If the loss amounts to fifteen per cent., then fifteen kilograms of sulphate are added to eighty-five kilograms of regained salt, the whole being boiled with twenty-three kilograms of lime. In the case of twenty per cent. loss, eighty kilograms of regained salts and twenty kilograms of sulphate are taken for the solution, and are boiled together with twenty-five kilograms of lime. If twenty-five per cent. of sulphate is to be added, seventy-five kilogrames of regained salts, twenty-five kilograms of sulphate, and twenty-eight kilograms of burnt lime are taken for the solution. In regular operation the uttermost limit of sulphate addition should be thirty per cent., seventy kilograms of regained salts, thirty kilograms of sulphate, and thirty-two kilograms of burnt lime. The proportion of salts, contained in the boiling solution is, on an average, thirty-seven per cent. sulphate of soda, eight per cent. carbonate of soda, twenty-four per cent. soda hydrate, twenty-eight per cent. sodium sulphide, three per cent. diverse combinations. This composition is very varying according to the qualities of the materials to be boiled.

The transfer from the soda-hydrate treatment to the described treatment with sulphate is accomplished in the preparation of the lye by replacing the losses of soda hydrate by the sulphate instead of by soda, and then with the disappearing of the hydrate gradually reducing the addition of lime during the boiling of the solution from forty-five per cent. to from about twenty to twenty-three per cent.

What I claim as new, and desire to secure by Letters Patent, is—

1. The process of producing cellulose from wood or other vegetable matters by boiling the same under pressure in a watery or hydrated solution containing sulphate of soda, carbonate of soda, soda hydrate, and sodium sulphide, substantially as set forth.

2. The process of treating sulphate of lime and the salts regained from the resultant material in the production of cellulose by boiling the same with lime, substantially as and for the purpose set forth.

In testimony whereof I have signed my name to this specification in the presence of two subscribing witnesses.

CARL FERDINAND DAHL.

Witnesses:
EMIL BEHNKE,
CARL WM. LOAHN.